United States Patent
Svitak et al.

(10) Patent No.: US 12,496,936 B2
(45) Date of Patent: *Dec. 16, 2025

(54) VEHICLE SEAT POSITIONING SYSTEM

(71) Applicant: SEARS MANUFACTURING CO., Davenport, IA (US)

(72) Inventors: Tylor Svitak, East Moline, IL (US); Eric Evans, Davenport, IA (US); Jeffrey Linnberg, Blue Grass, IA (US)

(73) Assignee: SEARS MANUFACTURING CO., Davenport, IA (US)

( * ) Notice: Subject to any disclaimer, the term of this patent is extended or adjusted under 35 U.S.C. 154(b) by 231 days.

This patent is subject to a terminal disclaimer.

(21) Appl. No.: 18/024,657

(22) PCT Filed: Sep. 8, 2021

(86) PCT No.: PCT/US2021/049463
§ 371 (c)(1),
(2) Date: Mar. 3, 2023

(87) PCT Pub. No.: WO2022/055996
PCT Pub. Date: Mar. 17, 2022

(65) Prior Publication Data
US 2024/0278692 A1    Aug. 22, 2024

Related U.S. Application Data

(60) Provisional application No. 63/076,034, filed on Sep. 9, 2020.

(51) Int. Cl.
*B60N 2/02*    (2006.01)

(52) U.S. Cl.
CPC ......... *B60N 2/0228* (2013.01); *B60N 2/0233* (2023.08); *B60N 2/0244* (2013.01); *B60N 2230/30* (2023.08)

(58) Field of Classification Search
None
See application file for complete search history.

(56) References Cited

U.S. PATENT DOCUMENTS

| | | |
|---|---|---|
| 5,254,924 A | 10/1993 | Ogasawara |
| 8,056,980 B2 | 11/2011 | Koutsky et al. |

(Continued)

FOREIGN PATENT DOCUMENTS

| | | |
|---|---|---|
| DE | 102019103652 A1 | 8/2020 |
| JP | 2013193667 A | 9/2013 |

(Continued)

OTHER PUBLICATIONS

European Patent Office, EP21867512.2, Sep. 9, 2024, Supplementary Search Report, 6 Pages.

(Continued)

*Primary Examiner* — Lail A Kleinman
(74) *Attorney, Agent, or Firm* — Goodhue, Coleman & Owens, P.C.

(57) ABSTRACT

A system for controlling the position of a vehicle seat is disclosed. The system includes in network communication, an input device, a detection system, at least one controller, and at least one controllable device. The detection system measures a current value of at least one of the recline, fore-aft, or swivel position of the seat. The input device communicates to the controllers a desired value for at least one of these seat positions. The controller compares the measured value to a limiting value and the desired value and calculates a movement factor value. The movement factor value determines the communication between the controller and the controllable device. If the movement factor value falls into a range where the seat can be moved to the desired value, the controller signals the at least one controllable device to control the adjustment of at least one of the recline position, the fore-aft position, or the swivel position to the (Continued)

desired value. However, if the movement factor value falls outside a range where the seat can be moved to the desired value, the controller signals the at least one controllable device to limit the adjustment of the at least one of the recline position, the fore-aft position, or the swivel of the position.

12 Claims, 4 Drawing Sheets

(56) References Cited

U.S. PATENT DOCUMENTS

| | | |
|---|---|---|
| 2017/0355282 A1* | 12/2017 | Zouzal .................... B60N 2/10 |
| 2019/0299814 A1* | 10/2019 | Yetukuri ................... B60N 2/01 |
| 2020/0247273 A1* | 8/2020 | Heath .................... B60N 2/753 |
| 2021/0129711 A1* | 5/2021 | Matha ..................... B60N 2/12 |
| 2021/0155123 A1* | 5/2021 | Lee ..................... B60N 2/0248 |
| 2023/0136911 A1* | 5/2023 | Nukui .................... B60N 2/793 |
| | | 296/24.34 |

FOREIGN PATENT DOCUMENTS

| | | |
|---|---|---|
| JP | 2017136898 A | 8/2017 |
| KR | 1020180022499 A | 3/2018 |

OTHER PUBLICATIONS

International Search Report, PCT/US2021/049463, Dec. 28, 2021, 3 Pages.

\* cited by examiner

VEHICLE SEAT POSITIONING SYSTEM

CROSS REFERENCE TO RELATED APPLICATION

This application claims priority to U.S. Provisional Application No. 63/076,034, filed on Sep. 9, 2020, the entirety of which is hereby incorporated by reference.

TECHNICAL FIELD

This invention relates to seats for vehicles, and more specifically to improvements in automatically positioning of vehicle seats in work vehicles.

BACKGROUND

This disclosure relates generally to vehicle seat adjustment systems, and more particularly to a system and method for electronically directing adjustment of one position of a vehicle seat based on another position of a vehicle seat.

Due to their size and configurations, many heavy duty vehicles, such as commercial semis, construction and farm vehicles have operator seats that are in tight environments. Although the seats may be adjustable, because of the environment, it can be difficult to adjust the seat to a preferable position that manages to stay away from negative interactions with cabin walls and consoles. The seats known in the art may allow the seat to be reclined or slide into the walls of the cabin, making it difficult to further adjust the seat for operator comfort.

Slide and recline positions in automotive seats are well known. Although both can generally be mechanically or electrically controlled, in the known art, the fore-aft seat position is independent of the recline position. However, automobiles generally do not face the same space restrictions as work vehicles.

In electronically controlled seats, the need to control the range of motion of one position of the seat based on another position of the seat has not been approached, especially in closed space areas. Thus, there is a need for an active automatic seat positioning adjustment system that ensures that the various positions of a seat adjust to the specific size of the vehicle cabin.

Therefore, what is needed is a seat positioning system that is limited in its ability to fully recline or swivel based upon its fore-aft position in the cabin and vice versa. This would provide for a better experience for work vehicle operators by quickly adjusting the seat based on certain preferences.

SUMMARY

The present disclosure is directed to an electronically controlled seat adjustment system that controls the range of adjustable seat variables based on a movement factor.

A method for running the system is also contemplated.

Other aspects will become apparent by consideration of the detailed description and accompanying drawings.

DETAILED DESCRIPTION

Figure 1:
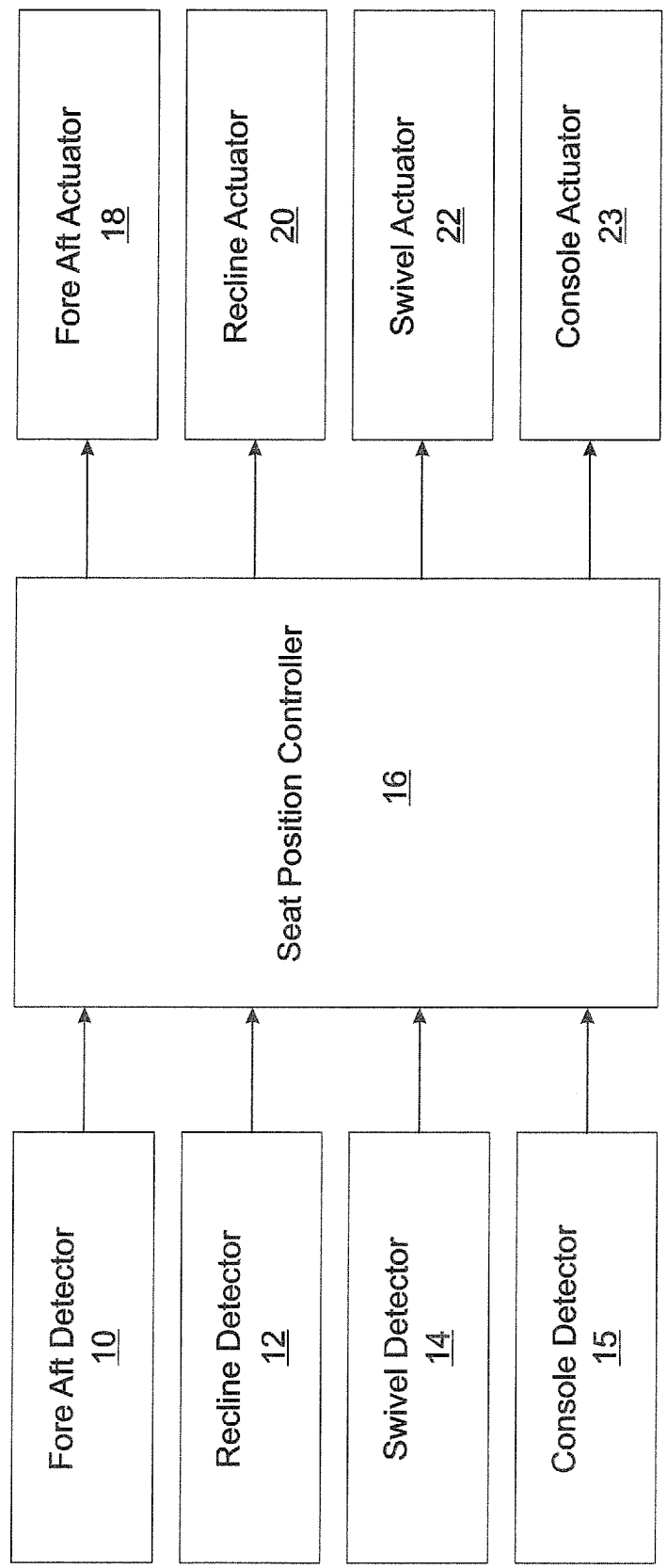
FIG. 1 is a block diagram of components of the vehicle seat position system disclosed herein.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains An electronically controlled vehicle seat positioning system which determines a movement factor and limits certain seat positions with respect to other seat positions is disclosed. The system takes into account the various cabin constraints of individual vehicles and can be adapted to many different types of motorized seats and cabin sizes. In an embodiment, a vehicle seat positioning system includes within communication with each other, a seat for supporting an operator, where the seat is capable of at least two of electrically controlled automatic recline, electrically controlled automatic fore-aft positioning, electrically controlled automatic swivel, a controller, at least one controllable device and a detection system configured to determine a current position of the seat recline, seat fore-aft position and/or seat swivel position. The detection system is operable to transmit signals to the controller, with the controller operable to signal to a controllable device, such as an actuator, to adjust the fore-aft, recline, and/or swivel positions of the seat based on a movement factor.

In one aspect of the electronically controlled seat positioning system, such as that shown in FIG. 1, one or more detectors 10, 12, 14 provide information about the fore-aft, recline, and/or swivel position of the seat. In certain embodiments, a console detector 15 is contemplated. These detectors may be located in the seat or suspension, although as is understood by the skilled artisan, the location of the detectors is immaterial as long as they are capable of transmitting information about the fore-aft, recline, and/or swivel position of a seat or console position. A detector can be a switch, sensor or motor.

Detectors 10, 12, 14 can measure seat position values by a change in resistance or a change in magnetic field or by digital pulses or sonar. The skilled artisan understands that the type of measurement method or value of the measurement is not limiting as long as the measurement provides information relating to the actual position of a seat. In one embodiment, the detector outputs a ratiometric voltage based on the supply voltage and detector position. But other detector outputs such as applicable current or digital outputs such as pulse width modulation (PWM), Inter-Integrated Circuit (I2C), Serial Peripheral Interface (SPI), controller area network (CAN), and Local Interconnect Network (LIN) are contemplated. As is understood by the skilled artisan, the seat position detectors can be of a variety of types of sensors and can be integrated in a variety of ways as is known in the art. The only limiting factor is that the seat position detector be able to sense the position of the seat in either a fore-aft position, a recline position, or a swivel position. In some embodiments, position detection will be based on time based calculations or time and current draw calculations from system actuators, such as if they are power motors.

In one embodiment a single detector will measure the fore-aft and recline position of the seat. In another embodiment, one detector will measure the fore-aft position of the seat and a separate detector will measure seat recline. The number of detectors is not meant to be limiting. Nor is the type of detector meant to be limiting. A single potentiometer sensor as a detector may be advantageous in that it gives immediate precise feedback. In another embodiment, an accelerometer sensor may be used. However, in the embodiments where an accelerometer is used, because accelerometer data must be further converted for accurate position data, the data using an accelerometer may be off shifted from real time data. Use of more than one detector may be important when dealing with safety critical components and the potential of a detector failure is not acceptable. Examples include steer by wire or fly by wire systems.

Software or firmware within a processor, such as a processor within vehicle seat position controller 16, is configured to receive a signal from at least one of detectors 10, 12, 14, whether a current or a voltage signal, and determine at least one position of the seat from the received signals, or at least determine a value indicative of at least one position of the seat. Controller 16 then calculates and converts these raw signals into an engineering value. To determine seat position, the raw signal may be voltage corresponding to distance, such as millimeters, or a percentage of travel. Controller 16 monitors in real time at least one position of the seat. It then programmatically calculates a movement factor based on if the current position is out of specification based on other positions, i.e. based on the limiting value. Values within specifications are those values within a predetermined acceptable range. For example, in different embodiments, this determination can be done with a look up table and interpolate values, a linear equation, or a complex equation that determines acceptable position limitations. In most embodiments, the complexity of these determinations is at least partially determined by the physical space constraints of the cabin environment, which can be preprogrammed into the system.

The vehicle seat positioning system according to the present disclosure is implemented through one or more controllable devices (18, 20, 22, 23). In one embodiment, controller 16 is configured to direct an actuator to move a position of a vehicle seat based on the movement factor. For example, if the desired position is outside of the confines allowing free movement as calculated in the movement factor value, the actuator may be directed by controller 16 to limit movement of the fore-aft direction of the seat based on the current position of the recline of the seat. Or based on the value of the movement factor, controller 16 communicates to controllable device 18, 20, 22, 23 to force movement of the recline position of the seat based on the fore-aft position. In yet another embodiment, an actuator causes movement of the swivel position of the seat based on either the recline or the fore-aft position of the seat.

Controller 16 can communicate either forced or preventative movement of a vehicle seat position according to the same principles. For example, if the vehicle seat is directed to the maximum aft value, the movement factor will be outside the allowable specifications and the actuators acting on a signal from the controller, will prevent recline of the seat past a certain level. In another embodiment, movement in the fore-aft direction will be prevented based on the value of the movement factor as determined by the present recline of the seat. For example, if the recline is in the maximum position, the movement factor will be outside the acceptable specifications and the controller will direct the actuator not to move the seat to the maximum aft position. Generally any actuator, such as an electric motor, that can move or restrict movement of electrical seat adjustment upon receiving a signal from controller 16 is contemplated herein.

Figure 2:
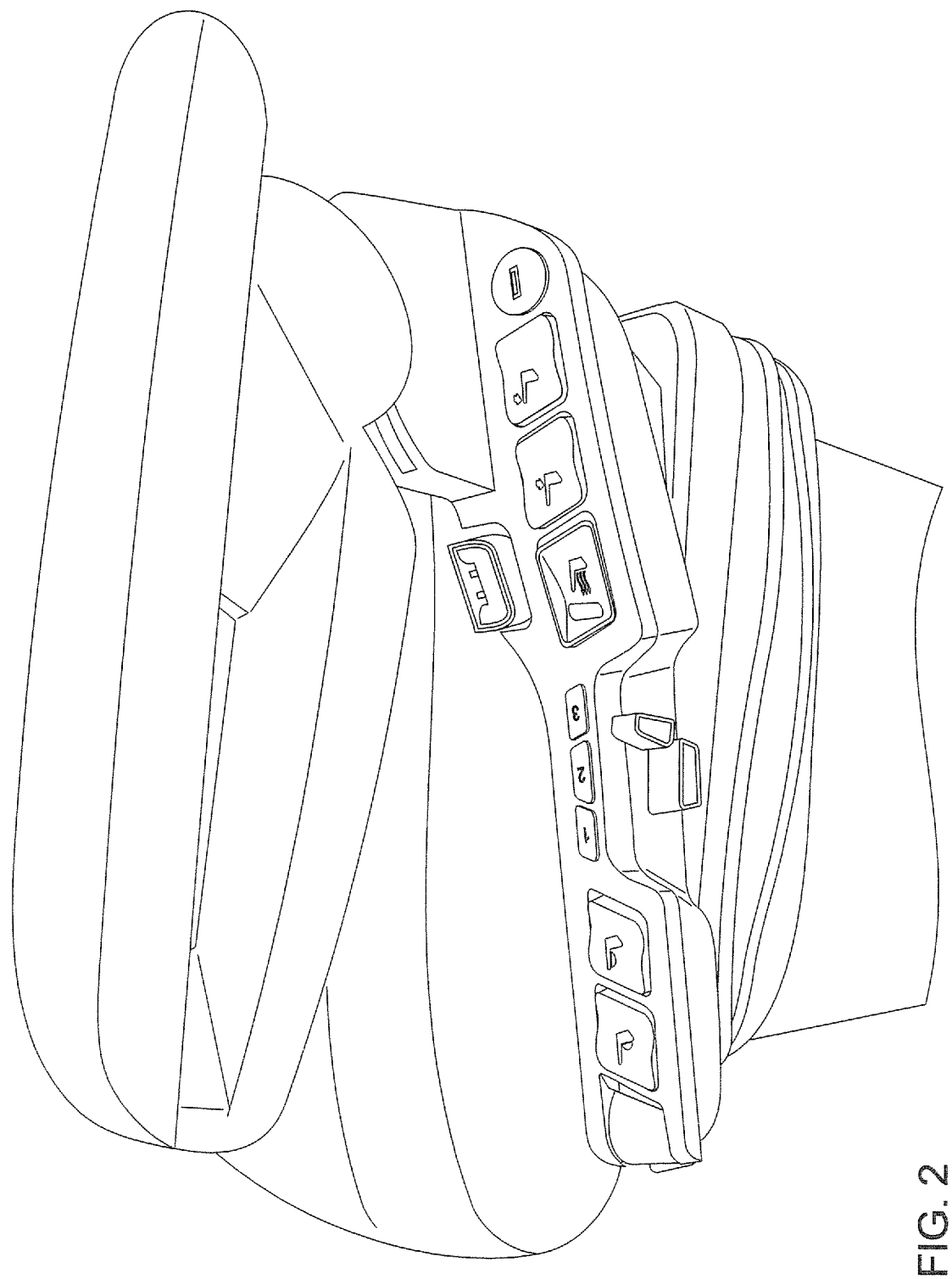
FIG. 2 is an exemplary seat of the vehicle seat position system showing input devices as buttons.
Figure 3:
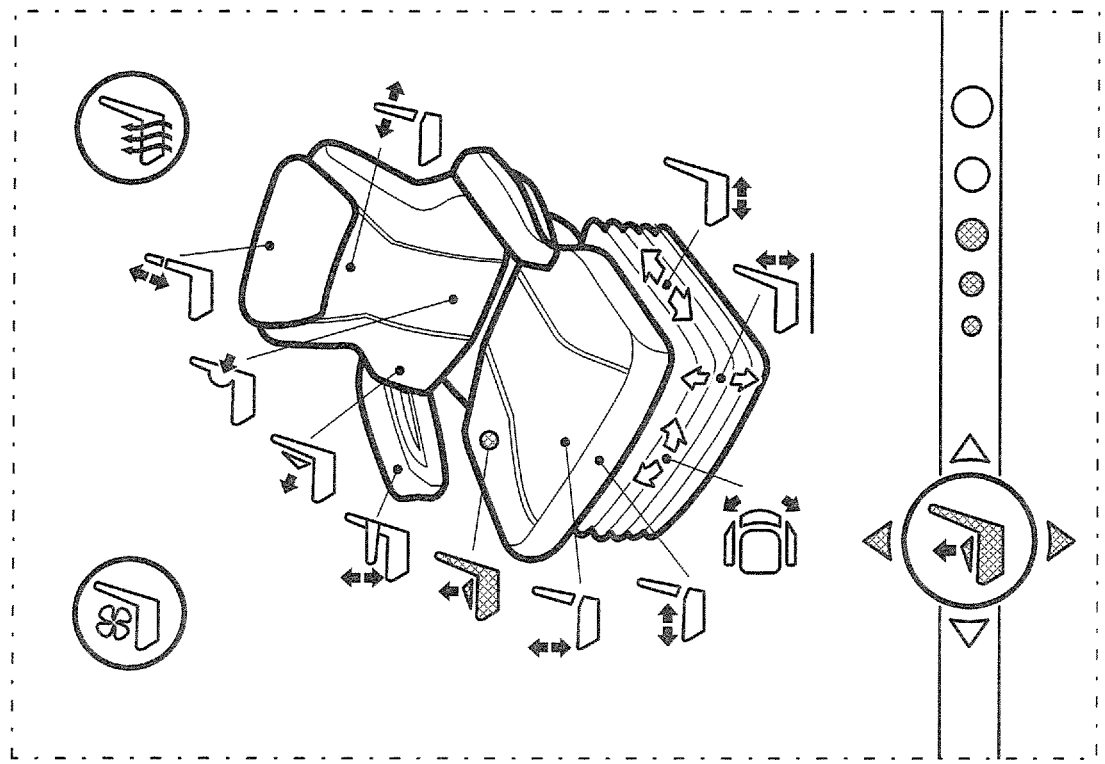
FIG. 3 is a touchscreen input device of the vehicle seat position system.

The desired position value of the seat is input using an input device in communication with controller 16. This desired position value may be a preprogrammed position known to provide the highest degree of comfort to the most operators. It may also be an individual position favored by an individual operator. In certain embodiments, the input device is preprogrammed memory in the controller. In other embodiments, the input device is a knob or touch screen. In certain embodiments, the controller signal to the actuators can be overridden manually by the operator setting a desired seat position through an input device. Examples of input devices that can be used with the disclosure are shown in FIG. 2 and FIG. 3. In FIG. 2, button 31 represents a fore-aft slide input device and button 33 represents a recline input device. In the example of override using a touch screen, such as the touch screen 30 shown in FIG. 3, the operator sets the desired seat positions through a human machine interface (HMI), and the resulting signal is sent to controller 16 to direct seat actuators 18, 20, 22, 23 to adjust the seat to the desired positions without calculating a movement factor. Different zones of touch screen 30, correspond to buttons 31 and 33. For example, touch screen zone 35 is a fore-aft slide input and touch screen zone 37 is a recline input. In some embodiments the operator will not be able to override the system.

Figure 4:
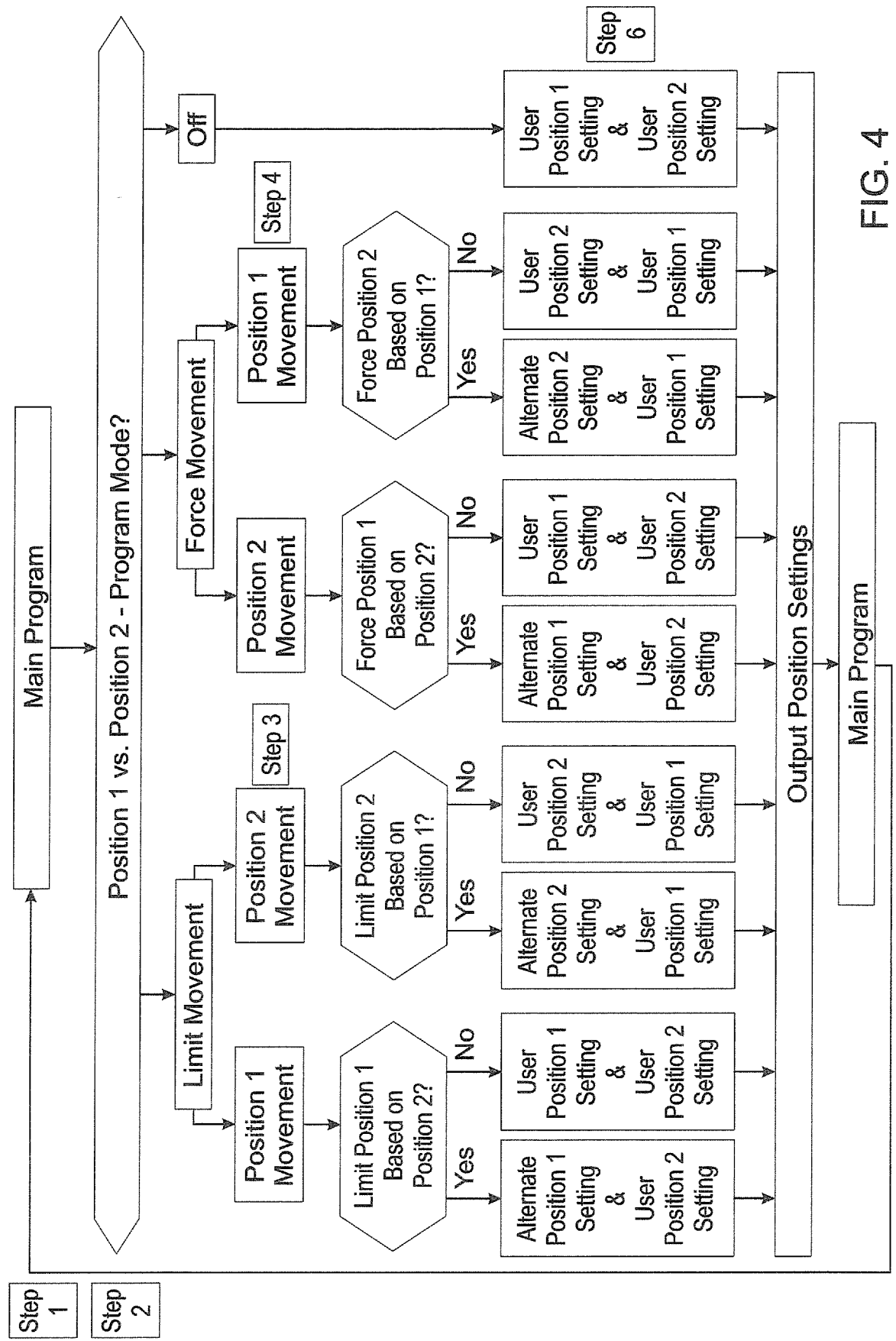
FIG. 4 is a flow chart of a method for seat position adjustment according to the present disclosure as implemented by the seat position controller shown in FIG. 1.

As an example, the system directs the steps according to the flowchart shown in FIG. 4. As shown in FIG. 4, in a first set of steps, controller 16 determines if the seat positioning system is functioning. (Step 1). If the system is not functioning, the seat is positioned based solely on operator or preprogramed input. If the system is functioning, information about one position of a seat is detected. If an operator has set a desired position through an input device in the functioning system, in this example, the system determines which seat position has been set by an operator, i.e. fore-aft position (position 1) or recline position (position 2) (Step 2) Based on the detection of position 1 or position 2, controller 16 then calculates a movement factor to determine whether the position of a different component should be limited (Step 3) or forced (Step 4). If the movement factor is outside of acceptable parameters, and that position 1 or position 2 should be limited or forced, controller 16 communicates to an actuator 18/20 to limit or force the other position (Step 5/Step 6). The available positions to limit or force are based appropriate movement factor values that allow positioning of the seat without negative interactions, such as with the cabin wall or a console, within its confined area.

Controller 16 can communicate with the various components of the system directly or indirectly. For direct communication, the components, such as detectors 10, 12, 14, 15 and actuators 18, 20, 22, 23 can be connected directly to the controller by appropriate wiring. Communication with controller 16 can be based on analog or digital signals and can follow a variety of communications protocols, such as LIN, CAN, UART, SPI and the like. Alternatively, the communication between controller 16 and certain system components can be wireless using a variety of known wireless communication protocols.

As shown herein, a single controller 16 is disclosed. However, there is no limitation on the number of controllers in the system. For example, two controllers may be present such as a parent/child. In this situation, a controller may collect the data but wait for instruction from a parent controller before directing movement of the actuators. And in yet another embodiment, one controller may collect the position information but another controller is responsible for directing movement of the actuators. In yet another embodiment, there may be one parent controller and several child controllers, i.e. in the event that the vehicle has more than a single seat.

In one embodiment, when the vehicle is on, controller 16 is configured to continuously run through the steps demonstrated by the flowchart loop of FIG. 4. In certain scenarios, an operator must only turn the key to power on the system. The system may also be turned off by the operator using an input device.

The present disclosure should be considered as illustrative and not restrictive in character. It is understood that only certain embodiments have been presented and that all changes, modifications and further applications that come within the spirit of the disclosure are desired to be protected.

What is claimed is:

1. A system for controlling the adjustment of a position of a vehicle seat, comprising:
   a vehicle seat, an input device, a detection system, at least one controller, and at least one controllable device, all constructed and configured in network communication;
   wherein the input device communicates to the at least one controller a desired value for at least one of a recline position of the seat, a fore-aft position of the seat, or a swivel position of the seat;
   wherein the detection system measures a current value of at least one of the recline position, the fore-aft position, or the swivel position; further wherein the detection system communicates the measured value to the at least one controller;
   wherein the at least one controller compares the measured value to a limiting value and the desired value and calculates a movement factor value; wherein the movement factor value determines the communication between the at least one controller and the controllable device; wherein if the movement factor value falls into a range where the seat can be moved to the desired value, the controller signals the at least one controllable device to control the adjustment of at least one of the recline position, the fore-aft position, or the swivel position to the desired value; wherein if the movement factor falls outside a range where the seat can be moved to the desired value, the controller signals the at least one controllable device to force the adjustment of the at least one of the recline position, the fore-aft position, or the swivel position.

2. The system of claim 1 further comprising a console and a console position.

3. The system of claim 1 wherein if the movement factor value falls outside a range where the seat can be moved to the desired value, the controller signals the at least one controllable device to limit instead of force the adjustment of the at least one of the recline position, the fore-aft position, or the swivel of the position.

4. The system of claim 1 wherein the at least one detector is a sensor.

5. The system of claim 1 wherein the controllable device is an actuator.

6. The system of claim 1, wherein the input device is a memory in the controller operable to store a desired recline position, a fore-aft position, or swivel position of the seat.

7. The system of claim 6, wherein the desired recline position, a fore-aft position, or swivel position of the seat is preloaded into the memory.

8. The system of claim 6, wherein the desired recline position, a fore-aft position, or swivel position of the seat is set by an operator.

9. The system of claim 1, wherein the input device is a touch screen.

10. The system of claim 1, wherein the input device is a knob.

11. The system of claim 1 wherein the detector system comprises two detectors, wherein one detector measures the seat recline position and the second detector measures the seat fore-aft position.

12. A system for controlling the adjustment of a position of a vehicle seat, comprising:
    a vehicle seat, an input device, a detection system, at least one controller, and at least one controllable device, all constructed and configured in network communication;
    wherein the input device communicates to the at least one controller a desired value for at least one of a recline position of the seat, a fore-aft position of the seat, or a swivel position of the seat;
    wherein the detection system measures a current value of at least one of the recline position, the fore-aft position, or the swivel position; further wherein the detection system communicates the measured value to the at least one controller;
    wherein the at least one controller compares the measured value to a limiting value and the desired value and calculates a movement factor value;
    wherein if the movement factor value falls into a range where the seat can be moved to the desired value, the controller signals the at least one controllable device to control the adjustment of at least one of the recline position, the fore-aft position, or the swivel position to the desired value; and
    wherein if the movement factor value falls outside a range where the seat can be moved to the desired value, the controller signals the at least one controllable device to force the adjustment of the at least one of the recline position, the fore-aft position, or the swivel position.

* * * * *